C. O. BRAUN.
CATTLE STANCHION.
APPLICATION FILED NOV. 1, 1909.
987,040.
Patented Mar. 14, 1911.
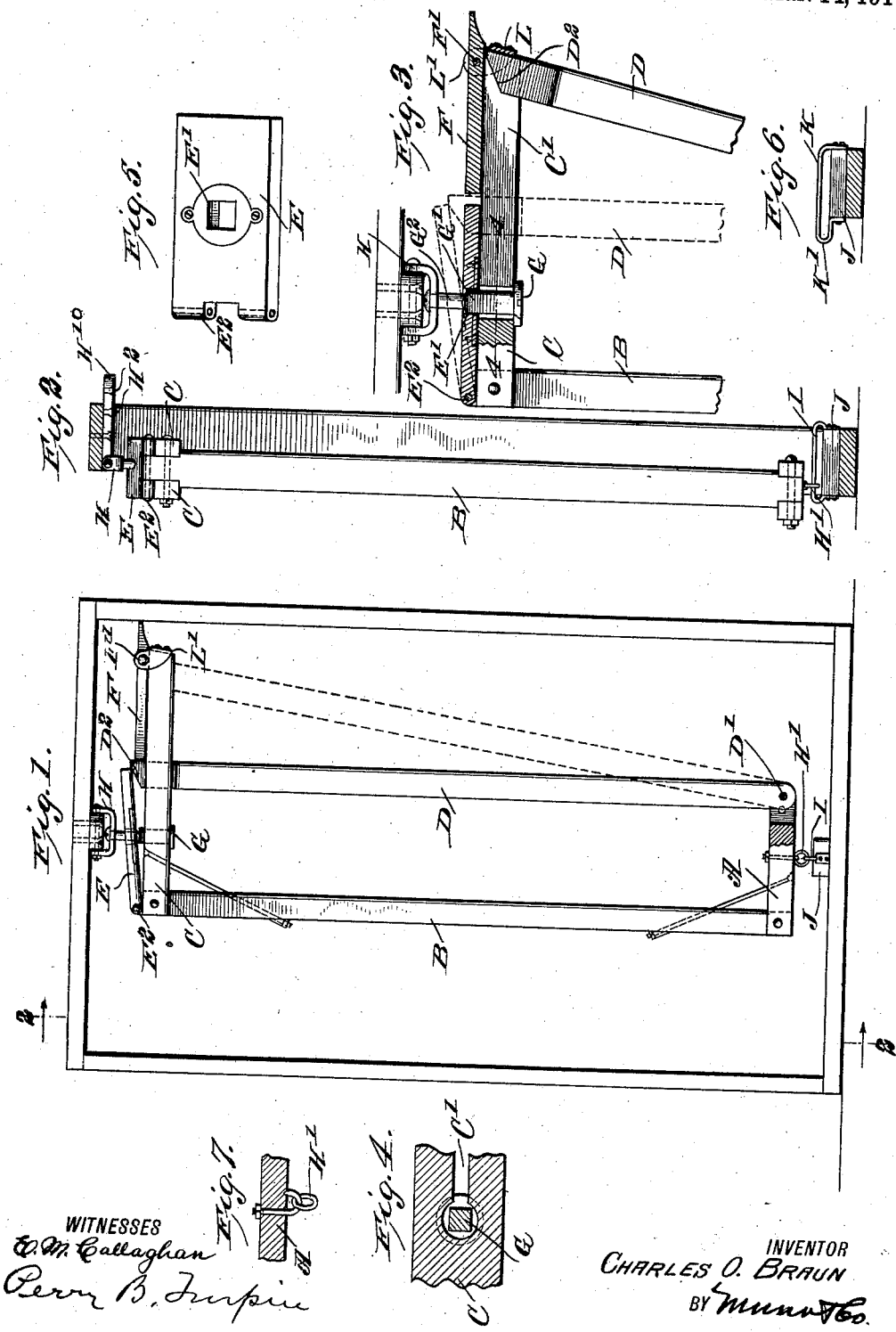
WITNESSES
INVENTOR
CHARLES O. BRAUN
BY Munn & Co.
ATTORNEYS

UNITED STATES PATENT OFFICE.

CHARLES OTTO BRAUN, OF BRILLION, WISCONSIN.

CATTLE-STANCHION.

987,040.

Specification of Letters Patent. Patented Mar. 14, 1911.

Application filed November 1, 1909. Serial No. 525,713.

*To all whom it may concern:*

Be it known that I, CHARLES OTTO BRAUN, a citizen of the United States, and a resident of Brillion, in the county of Calumet and State of Wisconsin, have made certain new and useful Improvements in Cattle-Stanchions, of which the following is a specification.

This invention is an improvement in cattle stanchions and has for an object among others to provide a novel construction of stanchion wherein the stanchion will be locked or held in position after the cow has entered her head when the stanchion is open, and will be free to turn when the cow has her head locked in the stanchion; and the invention consists in certain novel constructions and combinations of parts as will be hereinafter described and claimed.

In the drawing Figure 1 is an elevation of a stanchion embodying my invention with the bars in locked position, in which position they will hold the head of the animal and can be freely turned as desired. Fig. 2 is a vertical longitudinal section on about line 2—2 of Fig. 1. Fig. 3 is a detail section illustrating the construction at the upper end of the stanchion for locking the swinging bar of the stanchion and for freeing the latch which holds the stanchion from turning when not in use. Fig. 4 is a detail section on about line 4—4 of Fig. 3. Fig. 5 is a detail perspective view of the latch showing the reinforcing plate therein. Fig. 6 is a detail section showing a somewhat different construction of guide bail from that shown in Fig. 2, and Fig. 7 is a detail section illustrating the hook bolt carried by the base bar of the stanchion.

As shown, the stanchion has a base bar A, an upright B, and a top bar C, the upright being fixed at its opposite ends to the base and top bar as shown, and the bars A and C extending in the same direction from the upright. A swinging bar D is pivoted at its lower end at D' to the end of the base A opposite the upright B, and may be adjusted at its pivoted end toward and from the upright B in order to adapt the stanchion to large or small cattle, a plurality of holes being provided in the base bar for the pivot bolt at D' as best shown in Fig. 1 of the drawing. At its upper end the swinging bar D operates in a slot C' formed in the end of the bar C opposite the upright B, and when adjusted to locked position as shown in Fig. 1, the upper end of the swinging bar D projects above the upright C and is beveled at $D^2$ to operate upon the latch E and throw the said latch to the position shown in Fig. 1, when the stanchion is adjusted to locked position. By this construction, when the swinging bar is thrown into locked position wherein it is held by the bolt F, it operates to release the latch E by adjusting the said latch to the position shown in Fig. 1, all of which will be more fully described hereinafter. The bolt F is pivoted at F' and rides upon the upper end of the swinging bar D in the adjustment of the said bar D from the position shown in full lines Fig. 3, and dotted lines Fig. 1, to the position shown in full lines Fig. 1, and dotted lines Fig. 3. In the position shown in Fig. 1, the bolt F locks the swinging bar D in position to hold the head of the cattle and the swinging bar D holds the latch E out of locked position so the stanchion can turn freely about the bolt G as is desired in the use of the invention.

The bolt G is supported from above, it may be by means of a bail-shape bar H as shown in Fig. 1, to which the bolt G is fixed and held from turning, and the bolt is provided with an angular lower portion G' which projects above the top bar C and with a relatively reduced portion $G^2$ above the angular portion G', see Figs. 1 and 2. When the latch E is in the position shown in Fig. 1, its opening E' will be over the reduced portion $G^2$ of the bolt, the latch being adjusted to such position by lifting it at its end opposite its pivot $E^2$ which is accomplished by the swinging bar D before described. Then when the bar D is thrown outwardly in opening the stanchion, the latch E will drop to the position shown in Fig. 3, in which its angular opening E' will fit the angular portion G' of the bolt, thus locking the stanchion from turning when open so it will always be in position, when open, to receive the head of the animal.

In the operation of the described construction, it will be noticed that whenever the stanchion is locked as shown in Fig. 1, it is capable of turning freely upon the bolt G, and when the stanchion is open it is locked from turning thereby being in position to receive the head of the animal.

In practice, the bolt F may be varied as to length in order to lock the upper end of the swinging bar D at different angles toward or from the upright B.

In constructing the bolt G it will be noticed that it has an upper portion about which the latch can freely turn, and the lower portion interlocking with the latch so that when the latch is raised the stanchion may freely turn, and when the latch is lowered the stanchion will be held from turning.

In securing the lower end of the stanchion I provide it with a link H, sliding back and forth on a bail I. This bail may be formed as shown in Fig. 2, in which it projects slightly at its opposite ends beyond its supporting block J, or the bail may be constructed as shown in Fig. 6 in which it has a projecting portion K' at one end and may be reversed in order that this projecting portion may project to the front or rear as may be desirable in the use of the invention.

In pivoting the bolt F at F' I prefer to do this by extending the ends of a plate L, which plate L operates as an abutment or stop for the swinging bar D when the latter is thrown to open position and has its ends extended forming ears L', between which the bolt F is pivoted at F' as will be understood from Figs. 1 and 3 of the drawing.

It will be noticed that the block $H^{10}$ to which the yoke H is secured is adjustably connected by holes $H^2$ so that it may be set forward or back in such manner as to adjust the stanchion back and forward relative to the gutter in order to adapt the stanchion for long or short cattle as the case may be.

I claim—

1. A cattle stanchion having a top bar and a bolt supporting the same and projecting above the said top bar, said bolt having an angular portion projecting above the top bar, and a relatively reduced portion above said angular portion, a latch pivoted at one end and movable vertically at its other end and provided between its ends with an opening fitting the angular portion of the bolt and adapted to turn freely about the reduced upper portion of the bolt, a swinging bar operating at its upper end to lift the said latch when the bar is in locked position whereby to free the latch from engagement with the bolt, and means for holding the swinging bar in locked position substantially as set forth.

2. In a stanchion the combination with a top bar, and a bolt projecting above the same, of a latch having an opening receiving said bolt, the bolt having an upper portion about which the latch can turn, a lower portion interlocking with the latch in the latched position of the parts, and means for lifting the latch out of interlocked position in the closed position of the stanchion, substantially as set forth.

3. The combination in a stanchion of a top bar, a bolt therefor having a lower angular portion and a relatively small upper portion and a latch having a movement in the direction of length of the bolt whereby it may be adjusted to operate in connection with the smaller portion of the bolt to permit the stanchion to turn or in connection with the angular portion of the bolt to lock the stanchion from turning.

4. The combination in a stanchion with a top bar, a bolt, and a latch pivoted at one end whereby it may move up and down on the bolt and dropping into position to engage the bolt whereby to lock the bolt and stanchion from turning, of a swinging bar operating beneath the free end of said latch whereby it may lift the same to release it from engagement with the bolt, and means for holding the swinging bar in locked position, substantially as set forth.

5. The combination in a stanchion of a top bar, a bolt on which the top bar may be turned, a latch for engaging the bolt to lock the bar from turning, a swinging bar operating to free said latch from engagement with the bolt, and means for holding the swinging bar in locked position.

6. A stanchion which can be opened and closed combined with means about which the stanchion can turn when closed, and a latch movable into engagement with said means when the stanchion is opened whereby to lock the stanchion from turning, substantially as set forth.

7. The combination in a stanchion of a bar, a bolt having an angular portion about which the bar may be turned and a relatively smaller portion vertically offset with respect to the angular portion, a latch connected with the bar and having a movement in the direction of length of the bolt whereby it may be adjusted to operate in connection with the smaller portion of the bolt to permit the stanchion to turn, or in connection with the angular portion of the bolt to lock the stanchion from turning.

8. A stanchion which can be opened and closed, means about which the stanchion can turn when closed, a latch interlocking with said means when the stanchion is open and locking the stanchion from turning in such adjustment of the parts, substantially as set forth.

9. The improvement herein described comprising a stanchion, a bolt suspending the stanchion, means carried by the stanchion and interlocking with the bolt for locking the stanchion from turning when the stanchion is opened and means for automatically releasing said interlocking means when the stanchion is closed.

CHARLES OTTO BRAUN.

Witnesses:
GEO. E. DAWSON,
F. C. JENSEN.

Copies of this patent may be obtained for five cents each, by addressing the "Commissioner of Patents, Washington, D. C."